United States Patent [19]

Smith, III

[11] Patent Number: 4,694,859

[45] Date of Patent: Sep. 22, 1987

[54] UNDERSEA HYDRAULIC COUPLING AND METAL SEAL

[75] Inventor: Robert E. Smith, III, Stafford, Tex.

[73] Assignee: National Coupling Company, Inc., Stafford, Tex.

[21] Appl. No.: 801,477

[22] Filed: Nov. 25, 1985

[51] Int. Cl.$^4$ ............................................. F16L 29/00
[52] U.S. Cl. ............................ 137/614.04; 251/149.7; 285/108; 285/111; 285/917
[58] Field of Search ....... 285/108, 110, 111, DIG. 18, 285/917; 251/149.7, 149.6; 137/614.04

[56] References Cited

U.S. PATENT DOCUMENTS

| | | | |
|---|---|---|---|
| 1,913,982 | 6/1933 | Fox | 285/111 X |
| 1,928,821 | 10/1933 | Santiago | 285/111 X |
| 2,265,267 | 12/1941 | Cowles | 285/111 X |
| 2,825,590 | 4/1958 | Sutherland | 285/918 X |
| 3,046,026 | 7/1962 | Burrows | 285/917 X |
| 3,089,713 | 5/1963 | Scaranucri | 285/111 X |
| 3,111,179 | 11/1963 | Albers et al. | 285/918 X |
| 4,452,462 | 6/1984 | Karr, Jr. | 285/917 X |
| 4,582,295 | 4/1986 | Kugler et al. | 137/614.06 X |
| 4,641,841 | 2/1987 | Regan | 277/30 |

FOREIGN PATENT DOCUMENTS

| | | |
|---|---|---|
| 552862 | 4/1943 | United Kingdom . |
| 677685 | 8/1952 | United Kingdom . |
| 819421 | 9/1959 | United Kingdom . |
| 886133 | 1/1962 | United Kingdom . |
| 888143 | 1/1962 | United Kingdom . |
| 925491 | 5/1963 | United Kingdom . |
| 1603670 | 11/1981 | United Kingdom . |

OTHER PUBLICATIONS

Illustration of Connector Employing V-Seal, Bearing Notation "2:1 Scale".

*Primary Examiner*—A. Michael Chambers
*Assistant Examiner*—John C. Fox
*Attorney, Agent, or Firm*—Arnold, White & Durkee

[57] ABSTRACT

A coupling and metal seal are disclosed, primarily for use in undersea hydraulic applications. The female member of the coupling is of three-piece construction. The main body portion accepts a cylindrical retainer which is held captive within the body by means of a spring clip or snap ring. The metal seal is generally ring-shaped and is positioned within the body and held captive by the retainer and clip. The male member, or probe, of the coupling fits within the retainer and body and protrudes through the ring of the metal seal. The seal engages the circumference of the probe and, when the coupling is pressurized, the seal is urged against the probe circumference and against the interior wall of the body, effectuating a fluid seal within the coupling. The metal seal is not irrevocably deformed in use and may be used repeatedly.

21 Claims, 11 Drawing Figures

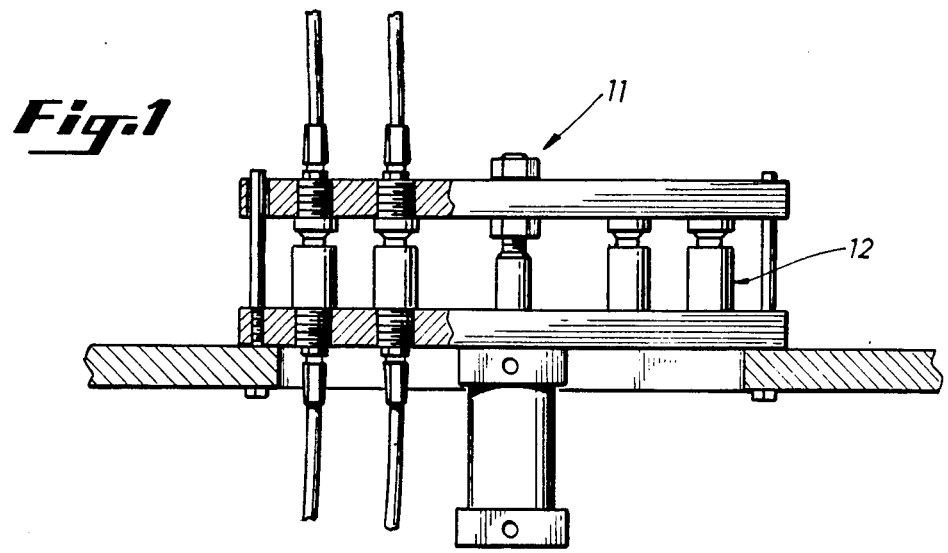
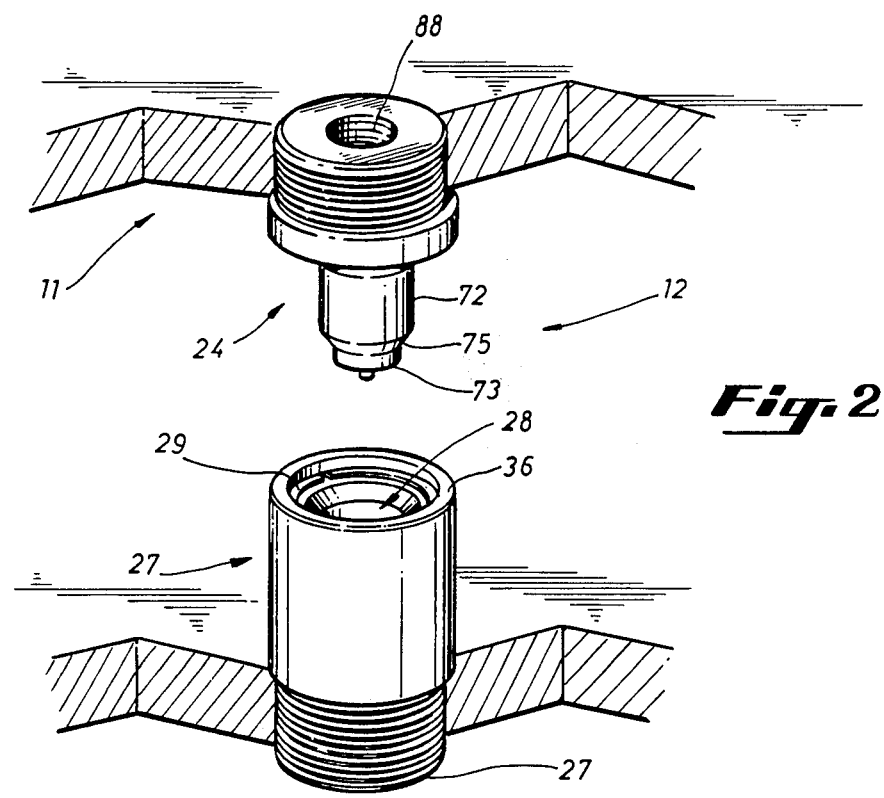

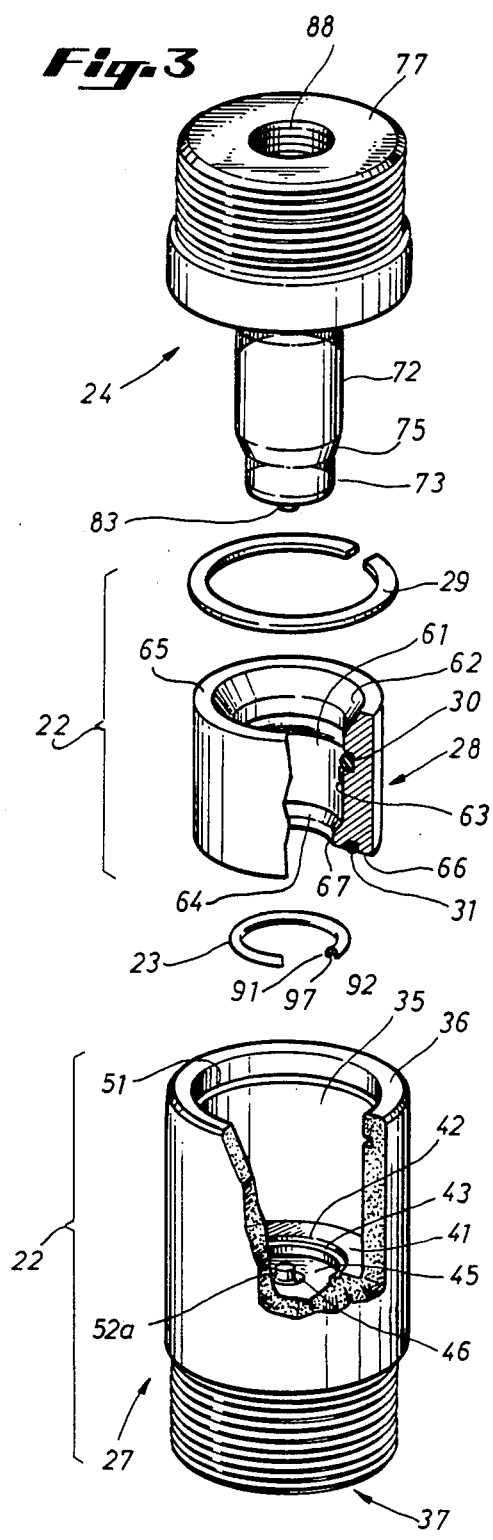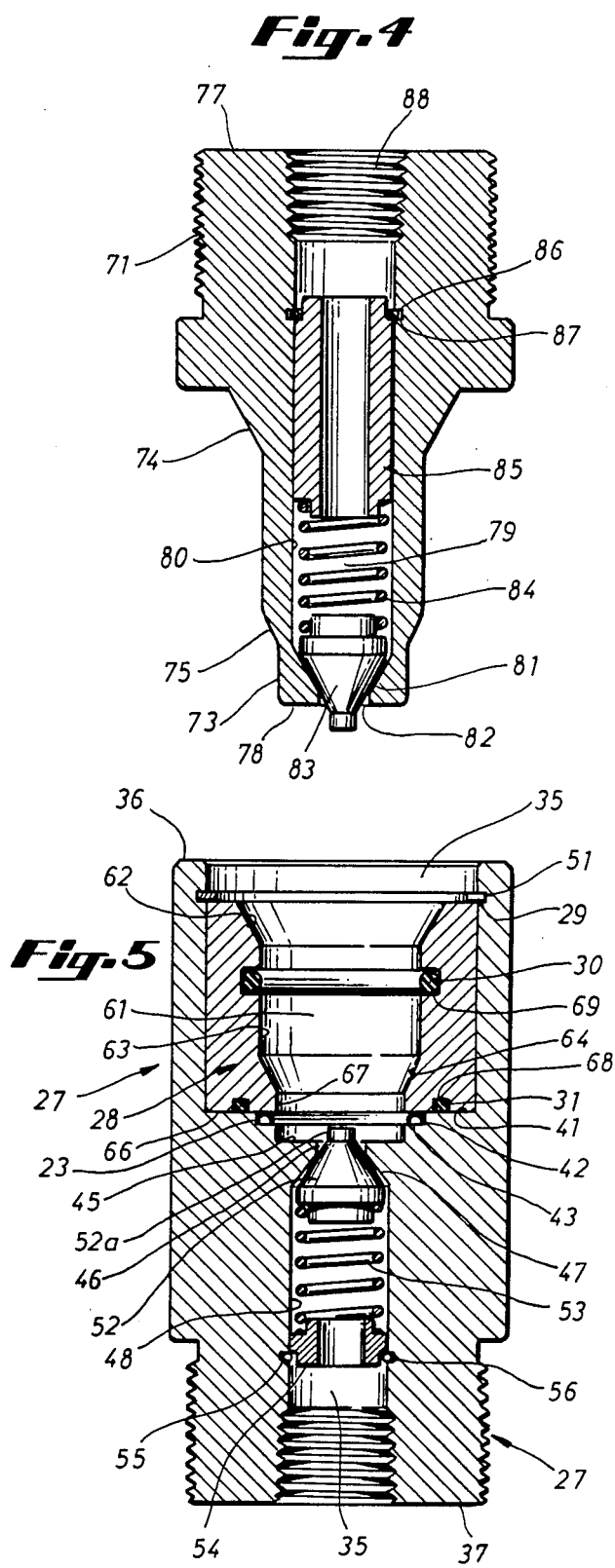

4,694,859

UNDERSEA HYDRAULIC COUPLING AND METAL SEAL

BACKGROUND OF THE INVENTION

1. Field of the Invention

The present invention relates to hydraulic couplings used in undersea drilling and production applications and seals used in those couplings. More particularly, the invention involves a four-piece coupling and a reusable metal seal for sealing the junction between the male and female members of the coupling.

2. Related Art

Subsea hydraulic couplings are old in the art. The couplings generally consist of a male and a female member with soft seals positioned within the female member to seal the junction between the male and female members.

The female member is generally a cylindrical body with a relatively large diameter longitudinal bore at one end and a relatively small diameter longitudinal bore at the other. The small bore facilitates connections to hydraulic lines, while the large bore contains the soft seals and receives the male portion of the coupling. The male member includes a cylindrical portion at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the soft seals, resembling O-rings, either abut the end, or face, of the male member or engage the male member about its circumference. The hydraulic fluid is then free to flow through the female and male portions of the coupling, and the seals prevent that flow from escaping about the joint in the coupling.

In some instances a check valve may be installed in the female member and also in the male member. Each check valve is open when the coupling is made up; however, each check valve closes when the coupling is broken, so as to prevent fluid from leaking out the system of which the coupling is a part.

The soft seals have numerous disadvantages, the principal ones being (1) the inability of the seal to withstand the deteriorating effects of the subsea environment for extended periods of time, and (2) the inability of the soft seal to contain the higher pressures being imposed on the hydraulic systems.

A metal seal is available which better withstands both the deteriorating effects of the environment and the higher pressures. That seal is a crush-type which is positioned between the end of the male portion of the coupling and the internal end of the large bore in the female portion. When the male portion is inserted into the female, the metal seal is crushed between the two portions and a seal is effectuated between the two. In view of the crushing action, the seal can be used only once. If the coupling is separated for any reason, the once-used crushed seal must be replaced with a new seal.

The male and female portions of the above couplings are each one-piece devices; and the seal is placed either in a circumferential groove about the interior of the large bore in the female member, or it rests at the interior end of that bore for engagement with the end of the male portion. Particularly in the case of the latter face-type seals, there is no mechanism for retention of the seal in the female section. If the coupling is parted under pressure, the seal will generally blow out of the female section and be lost. There may also be risk of injury to the operator parting the coupling.

SUMMARY OF THE INVENTION

The present invention overcomes the above-mentioned disadvantages by providing a coupling wherein the female portion or section is of three pieces. The female portion or section generally comprises a tubular body, a retainer, and a clip. A reusable metal seal is provided which is positioned within the body and held in place by the retainer. The clip holds the retainer within the body, preventing escape of the retainer or the seal from the body. When the male and female portions of the coupling are parted under pressure, the seal is prevented from blowing out.

The metal seal is preferably a reusable seal which engages the circumference of the male portion of the coupling. When fluid pressure is applied to the interior of the coupling, this annular seal expands radially inwardly to increase the sealing force against the side of the male member.

BRIEF DESCRIPTION OF THE DRAWINGS

FIG. 1 is an elevation view of a manifold incorporating couplings such as that of the present invention.

FIG. 2 is a perspective view of a coupling of the present invention showing how the coupling might be connected to the manifold of FIG. 1.

FIG. 3 is an exploded perspective view of one embodiment of the present invention with the retainer, the metal seal, and the body partially cut away.

FIG. 4 is a section view of the male member.

FIG. 5 is a section view of the body with the metal seal, retainer, and clip in place.

DETAILED DESCRIPTION OF A PREFERRED EMBODIMENT

Figure 6:
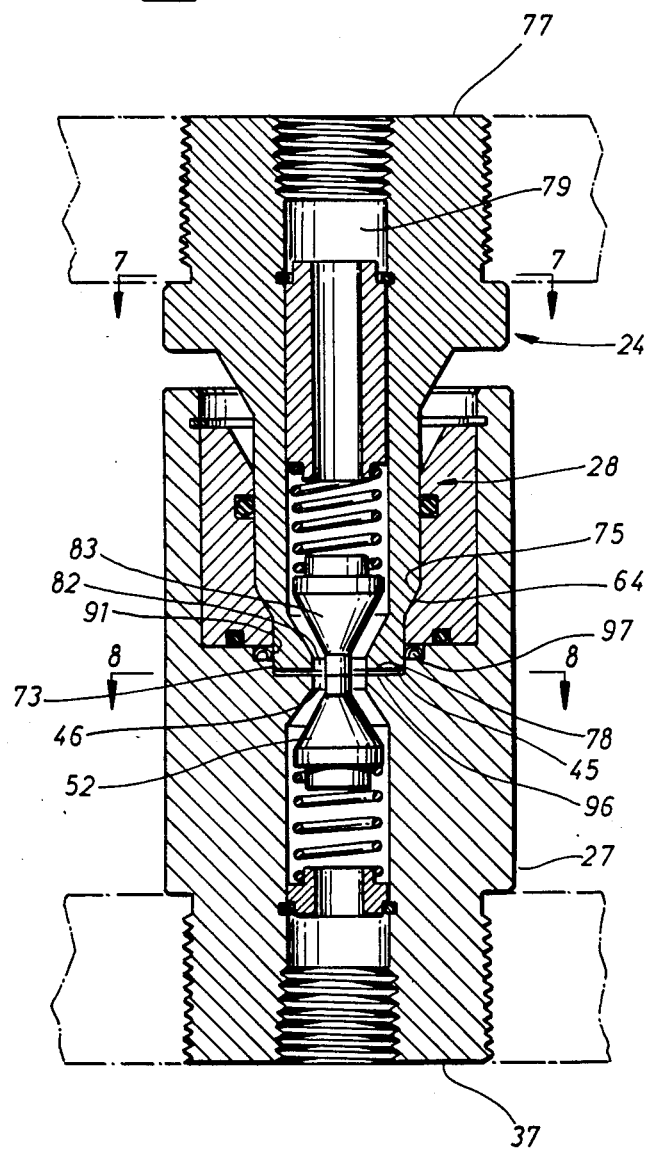
FIG. 6 is a section view of the assembled coupling.
Figure 7:
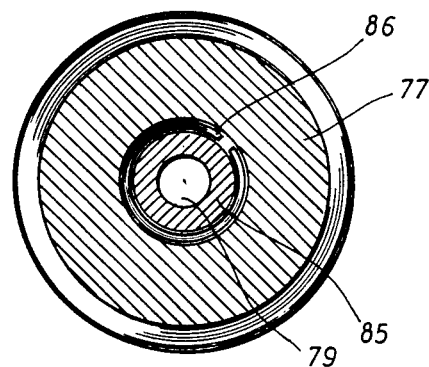
FIG. 7 is a cross-section view of the assembled coupling taken along the lines 7—7 of FIG. 6.
Figure 8:
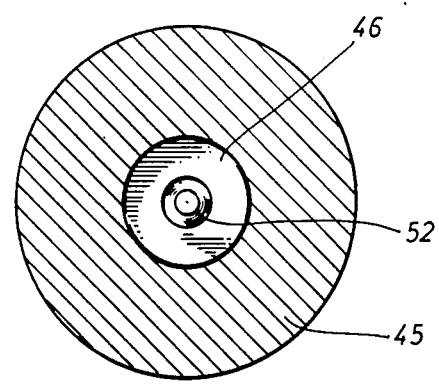
FIG. 8 is a cross-section view of the assembled coupling taken along the lines 8—8 of FIG. 6.

FIG. 1 is an elevation view of a manifold 11 which is commonly used with undersea hydraulic couplings. The couplings 12 are generally connected to opposing plates of the manifold and are held together by bolts or hydraulic members attached to the plates. As shown in FIG. 2, the male member 24 is commonly attached to one plate while the female member 27 is attached to the second plate so as to face male member 24 and align with it. The male and female members may be attached to the manifold plates using various means, such as set screws or threads. Techniques for attaching the members to such plates are well known to those skilled in the art.

FIG. 3 is an exploded perspective view of the coupling and metal seal of the present invention. As shown, the main components of the coupling include a female member 22, a metal seal 23, and a male probe 24. The female member, or body, 22 and the male probe 24 each comprise sub-components which will be more fully described below.

As shown in FIG. 3, the female member 22 comprises several components, including a body or receiver 27, a retainer 28, and a clip 29. Also included are an annular, or axial, soft seal 30 and a face soft seal 31.

The body 27 is cylindrical in shape, having a bore 35 extending along its longitudinal axis from receiving end 36 to terminal end 37. The bore 35 has several variations in its diameter as it extends through the body 27.

Bore 35 has its greatest diameter beginning at the receiving end 36. Adjacent and inboard of the receiving end 36 of body 27 is a retainer clip groove 51. The groove 51 is used in conjunction with a clip 29 as will be more fully explained below.

The diameter of bore 35 is uniform from the receiving end 36 to a retainer seat 41. The retainer seat 41 is a circumferential shoulder, the plane of which is perpendicular to the longitudinal axis of the body 27. The retainer seat 41 and a seal riser 42 define a stepped reduction in the diameter of bore 35, as shown in FIG. 3. As can be seen, the seal riser 42 has a circular cross-section which is concentric with and smaller than the circular cross-section of the bore 35.

The reduced diameter of the bore 35 extends from the retainer seat 41 to the seal shoulder 43. The shoulder 43 once again defines a stepped reduction in diameter of bore 35. Again as can be seen, this reduced diameter is also circular in shape and centered about the longitudinal axis of the body 27. This reduced diameter extends from the seal shoulder 43 to the probe seat 45.

The probe seat 45, like the seat 41 and the shoulder 43, lies in a plane which is perpendicular to the longitudinal axis of body 27. The inside diameter of its annular shape defines valve port 46.

As can best be seen in FIG. 5, the port 46 is of uniform diameter and extends longitudinally from the probe seat 45 to the valve seat 47. The seat 47 is conical in shape and effectuates an enlargement of the bore 35 as it extends from the valve port 46 toward the terminal end 37.

The valve seat 47 terminates in bore wall 48. Wall 48 defines a uniform diameter of the bore 35 extending from the valve seat 47 to the terminal end 37. Immediately adjacent the terminal end 37 are threads 49 for engaging a threaded incoming hydraulic line or fitting (not shown).

The body 27 further comprises a check valve 52, a valve spring 53, a spring collar 54, and a collar clip 55.

The valve 52 is generally conical in shape and substantially conforms to the valve seat 47. Located at the apex of the conical shape of the valve 52 is a tip or stem 57, which is cylindrical in shape and extends along the longitudinal axis of the conical shape of the valve 52. The tip or stem 57 extends through the valve port 46 and terminates between the plane of the probe seat 45 and the plane of the seal shoulder 43.

The valve spring 53 is located within the bore wall 48 with one end of the spring 53 in contact with the base of the valve 52. The opposite end of the spring 53 is in contact with the spring collar 54.

Collar 54 is an elongated ring of circular cross-section, as seen in FIG. 5. The outer diameter of the collar 54 is slightly less than the diameter of the bore 35 as defined by bore wall 48, so that the collar 54 may be easily inserted therein. The collar 54 engages the end of the helical valve spring 53.

The collar 54 is retained within bore 35 and is urged into contact with the spring 53 by means of a collar clip 55 and clip groove 56. The groove 56 is located in the bore wall 48 and extends continuously about wall 48. The clip 55 is a spring clip or snap ring which may be compressed inwardly so as to reduce its diameter for insertion into bore 35 and thereafter expand outwardly to engage the outer diameter of the groove 56. The inner diameter of the clip 55 is less than the outer diameter of the collar 54, thus preventing the escape of collar 54 from bore 35.

As shown in FIG. 3, retainer 28 is essentially a sleeve with an annular shape. As shown in FIG. 5, the outside diameter of retainer 28 is uniform and has a sliding fit within the bore 35 at the receiving end 36 of body 27. The diameter of retainer bore 61 varies along the longitudinal axis of the retainer 28 and is generally defined by an upper probe seat 62, a retainer wall 63, and a lower probe seat 64.

As seen in FIGS. 3 and 5, the retainer bore 61 has its greatest diameter at the receiving end 65. The upper probe seat 62 inclines downwardly and inwardly to gradually reduce the diameter of the bore 61. The retainer wall 63 begins at the lower edge of the seat 62 and terminates at the upper edge of the lower probe seat 64. The bore 61 has a uniform diameter along the length of the retainer wall 63, except for seal groove 69 which will be discussed below. The lower probe seat 64 slopes inwardly and downwardly, further restricting the diameter of bore 61. The probe seat 64 terminates at its lower end in a lower retainer wall 67. The wall 67 terminates at the retainer face 66 which lies in a plane perpendicular to the longitudinal axis of retainer 28.

A face seal groove 68 is annular in shape, as shown in FIG. 5, and is centered on the longitudinal axis of the retainer 28. The groove 68 is located adjacent the retainer face 66. The seal groove 69 is similar to groove 68 and is located in the retainer wall 63.

Annular seal 30 and face seal 31 are of a relatively pliable material, for example, rubber or synthetic elastomer. Annular seal, or O-ring, 30 is generally ring-shaped and is located in the seal groove 69. The face seal 31 is also substantially ring-shaped and is located in the face seal groove 68. Annular seal 30 and face seal 31 are each of greater thickness than the respective depths of the grooves 69 and 68. As a result, the seals 30 and 31, when properly positioned in their respective grooves, protrude slightly therefrom.

Clip 29 is a spring clip, or snap ring, whose outside diameter is greater than the diameter of the clip groove 51 described above. As shown in FIG. 5, the inside diameter of the clip 29 is less than the diameter of the bore 35 and is also less than the outside diameter of the retainer 28. When the clip 29 is positioned in the groove 51, it exerts an outward expanding force against the groove 51.

The probe 24, as shown in FIGS. 3 and 4, comprises generally three cylindrical shapes. A probe handle 71 is a cylinder of substantially uniform outside diameter. Threads may be added to the external surface to facilitate attachment to a coupling manifold, as explained above, or the external surface may be machined smooth and the probe may be attached to the manifold by means of set screws. A probe wall 72 and a probe head 73 also have uniform outside diameters.

The probe handle 71 and probe wall 72 have the same longitudinal axis and are connected by the shoulder 74. The shoulder 74 is a truncated, conical section whose larger diameter face is coincident with an end of the handle 71, and whose smaller diameter face is coincident with an end of the wall 72.

The probe head 73 is a cylindrical member lying along an extension of the longitudinal axis of the probe wall 72. The head 73 is connected to the wall 72 by means of the shoulder 75. The shoulder 75 is a truncated cone section whose larger diameter face is coincident with an end of the wall 72, and whose smaller diameter face is coincident with an end of the head 73.

As shown in FIGS. 3 and 4, a passageway 79 of circular cross-section is centered on the longitudinal axis of the probe 24 and extends from a terminal end 77 to a probe face 78. Near the probe face 78, the bore wall 80 slopes inwardly to form a valve seat 81. Adjacent the probe face 78, the bore wall 80 again parallels the longitudinal axis of the probe 24, defining a valve port 82 therein. The valve port 82 is of substantially the same diameter as the valve port 46 in the body 27.

As in the body 27, the probe 24 contains a check valve 83, a valve spring 84, a spring collar 85, and a collar clip 86. The structure of this valve assembly is substantially the same as the structure of the corresponding valve assembly in the body 27 described above. A clip groove 87 is located in the bore wall 80 near the terminal end 77 of the probe 24. As in the case of the valve assembly in the body 27, a clip groove 87 retains a collar clip 86 which, in turn, retains a spring collar 85 within the bore 79.

Also located in the bore 79 adjacent the terminal end 77 are threads for receiving a threaded incoming tubular member or fitting (not shown).

Referring to FIG. 3, an annular metal seal 23 of the present invention is generally ring-shaped when viewed from its end and is preferably C-shaped in cross-section to resemble a circular hemi-toroid. As shown in FIGS. 5 and 6, the seal 23 is positioned between the retainer face 66 of the retainer 28 and the seal shoulder 43 of the body 27. The outside diameter of the seal 23 is substantially the same as the diameter of the bore 35 as defined by the seal riser 42. The inside diameter of the seal 23 is substantially the same as the outside diameter of the probe head 73 of the probe 24. The height of the seal 23 is slightly greater than the height of the seal riser 42 of the body 27 shown in FIG. 5. However, seal 23 may be of a height slightly less than that of seal riser 42 as its radial expansion during operation of the coupling will not be substantially altered. The seal 23 is preferably a metallic, elastic member capable of regaining its original shape following compression.

OPERATION OF THE PRESENT INVENTION

Assembly of the coupling and metal seal of the present invention is substantially as follows:

The three-piece female member or portion 22 is first assembled, together with the annular metal seal 23. As shown in FIG. 5, the seal 23 is positioned in the body 27 and rests on the seal shoulder 43. The retainer 28 is inserted into the bore 35 from the receiving end 36 of the body 27 with the face 66 inserted first. The retainer 28 slides into the bore 35 until its face 66 is in close proximity to the retainer seat 41 of the body 27. Due to the presence of the soft face seal 31 and the metal seal 23, the retainer face 66 is restrained from actually contacting the retainer seat 41.

Continuing assembly of the female member or portion 22, the retainer 28 is forced axially toward the retainer seat 41 sufficiently to allow insertion of the retainer clip 29 into the clip groove 51 of the body 27. The clip 29 prevents escape of the retainer 28 from the bore 35, and the female member 22 composes a unit in which the metal seal 23 is entrapped.

Because the retainer 28 is forced into position allowing insertion of the clip 29, the soft face seal 31 is slightly compressed and the metal seal 23 is axially compressed, or "loaded". This axial loading of the annular seal 23 causes it to expand radially both inwardly and outwardly, engaging the seal riser 42 on its outboard edge 92 and protruding into the bore 35 on its inboard edge 91. The female member 22 and annular seal 23 are then ready to receive the probe 24.

The probe 24 is inserted into the retainer bore 61 with its face 78 entering the bore 61 first. As the probe wall 72 begins to enter the retainer bore 61, it begins to engage the soft annular seal 30. This contact compresses the seal 30 and creates a sliding seal between it and the probe wall 72.

Figure 9:
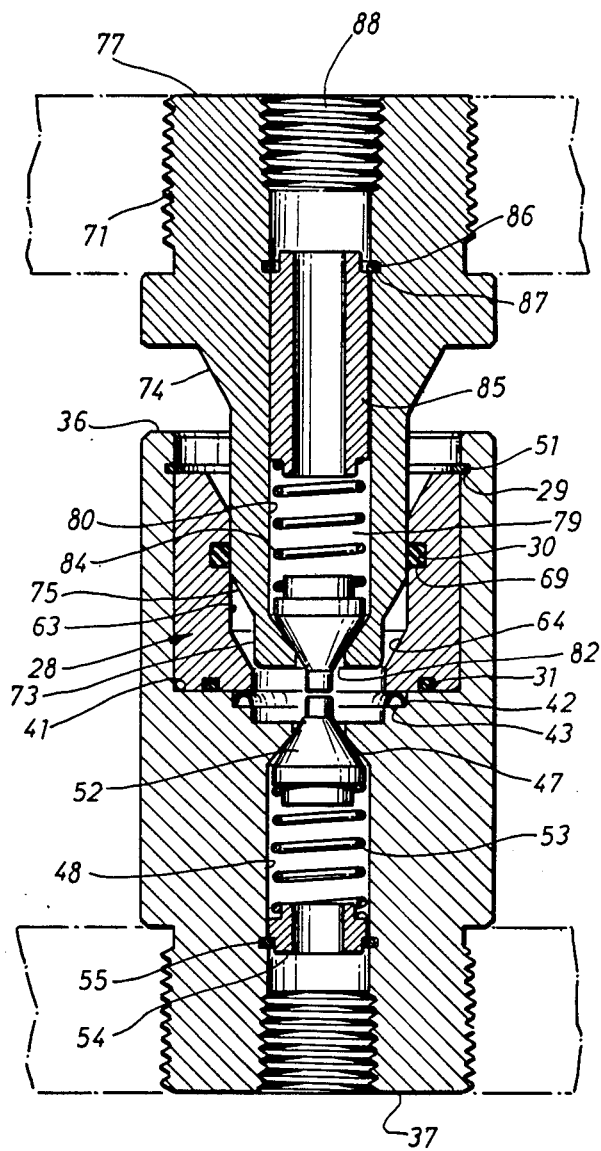
FIG. 9 is a section view of a partially made-up coupling.
Figure 10:
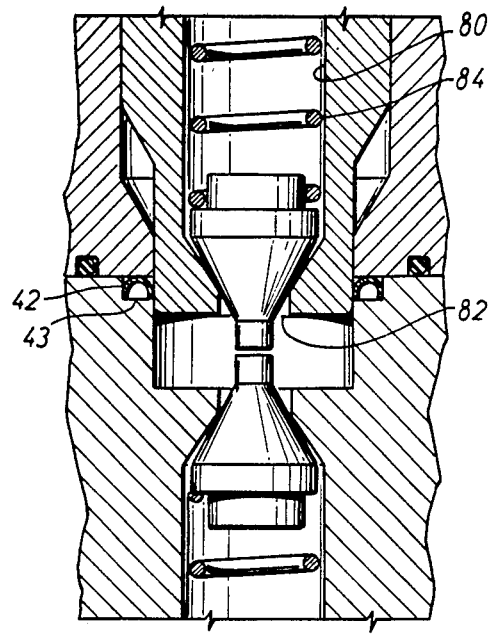
FIG. 10 is a blown-up section of a partially made-up coupling, showing the male member protruding through the retainer and past the metal annular seal.
Figure 11:
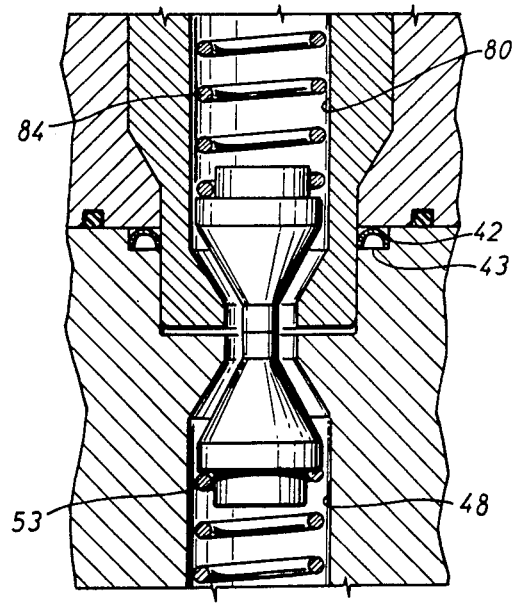
FIG. 11 is a blown-up section of the coupling in its fully made-up position.

As insertion of the probe 24 is continued, the probe head 73 begins to pass through the annular metal seal 23. This may easily be seen in FIG. 9. The inboard edge 91 of the seal 23 begins to engage the circumference of the probe head 73. The end of the probe valve tip 88 contacts the end of the valve tip 57 located in the body 27, and continued insertion of the probe 24 into the bore 35 causes the valves 83 and 52 to open.

As can be seen in FIG. 6, the probe 24 is forced into the bore 35 until the probe face 78 contacts the probe seat 45. At that point, the probe shoulder 75 is also in contact with the lower probe seat 64. Further, the inboard edge 91 of the annular metal seal 23 is engaging the circumference of the probe head 73 in the region near the shoulder 75.

The complete insertion of the probe 24 into the retainer 28 and the body 27 allows the passage of fluid into the terminal end 37 of the body 27, through the valve 52 and port 46, through the port 82 and valve 83, continuing through the probe bore 79 and exiting the terminal end 77 of the probe 24. Fluid may flow in either direction through the coupling. Because there is no seal between the probe face 78 and the probe seat 45, pressurized fluid will be forced through the resulting gap 96 into the cavity 97 of the annular seal 23.

The presence of the pressurized fluid in the cavity 97 causes the seal to tend to expand. Because the seal 23 is restrained on its upper edge by the retainer 28, its inboard and outboard edges 91 and 92 are urged radially inwardly and outwardly, respectively, against the probe head 73 and the seal riser 42. This radial force increases the fluid seal between the seal 23 and the probe head 73 and between the seal 23 and the seal riser 42. As a result, fluid is prevented from escaping around the seal 23. As the pressure of the fluid flowing through the coupling is increased, the pressure within the cavity 97 of the seal 23 is correspondingly increased and the fluid seal created thereby is also enhanced.

Because the annular seal 23 engages the circumference of the probe head 73, a relatively substantial amount of longitudinal displacement between the probe 24 and the female member 22 may be tolerated as the inboard edge 91 of the annular seal 23 will continue to engage the circumference of the probe head 73. This can be most easily seen in FIGS. 6 and 9.

By varying the length of the probe head 73 on the probe 24 and the depth of the probe seat 45 in the body 27, varying tolerances for relative longitudinal movement can be obtained. This feature is of great advantage because of the inability of the manifolds in which these devices are used to eliminate such relative longitudinal movement. Warping and other movement of the manifold plates results in relative displacement of the male member with respect to the female member and face seals as would be used between probe face 78 and probe seat 45 would tend to lose their effectiveness.

One advantage of the three-piece female member of the coupling of the present invention is that, when the coupling is parted under pressure, the metal seal 23 is retained within the body 27 by the retainer 28, thereby preventing blowout of the seal.

Other advantages of the present invention include the reusable nature of the annular metal seal 23. As distinguished from the crush-type metal face seal, the seal of the present invention is not crushed but rather conforms to the limitations of the seal riser 42, the retainer 28, and the probe head 73, and may be used repeatedly.

As mentioned above, partial separation between the probe 24 and the female member 22 can be tolerated using the coupling and seal of the present invention. In contrast, the metal face seal currently in commercial service tolerates virtually no axial separation. Indeed, many couplings using the current metal face seal require an external pre-load mechanism to prevent relative longitudinal movement between the probe 24 and the female member 22.

An additional advantage of the coupling of the present invention is its ready substitutability for hydraulic couplings of the prior art. The coupling of the present invention can replace a coupling of the prior art on a one-for-one basis without further modification of the new coupling or the use of pre-load mechanisms or other equipment beyond the coupling itself.

As can be expected and as will be appreciated by one skilled in the art, the embodiment of the present invention described above may be modified in numerous ways without departing from the scope of the invention. For example, the soft seals 30 and 31 may be eliminated without affecting the operation or reliability of the coupling of the present invention. The seals 30 and 31 are for back-up purposes and are not required.

The present coupling may also be used without valves 52 and 83 and their respective valve assemblies. As will be apparent, the valves serve to seal the two portions of the coupling upon parting of the coupling, thereby reducing possible losses of fluid. As will also be apparent, the overall configuration of the retainer 28, the body 27, and the probe 24 may be altered significantly without impairing their functions. Also, the retainer 28 may be permanently affixed to the body 27 after assembly of the female member 22, such as by welding or other means, or may be made a part of the probe 24, for example, by attaching it to the probe wall 72.

Although variations in the embodiment of the present invention may not each realize all the advantages of the invention, certain features may become more important than others in various applications of the device. The invention, accordingly, should be understood to be limited only by the scope of the appended claims.

What is claimed is:

1. A coupling, comprising:
    (a) a body having a first longitudinal bore, said first bore having a circumferential shoulder therein;
    (b) a retainer adapted to be inserted into a first end of said first longitudinal bore and to seat on said shoulder, said retainer having a second longitudinal bore;
    (c) a probe adapted to be inserted through said second longitudinal bore ane into said first longitudinal bore; and
    (d) a reusable annular metal seal insertable into said first longitudinal bore to be interposed between said shoulder and said retainer upon insertion of asid retainer into said first longitudinal bore, said seal being configured to engage said first bore and the circumference of said probe as said probe is inserted through said second bore and into said first bore.

2. The coupling of claim 1, further including a locking member for interengaging said reatiner and said body to cause said retainer to maintain said seal in seating relation with said shoulder.

3. The coupling of claim 2, wherein said first bore includes a circumferential groove adjacent said first end of said first longitudinal bore, and wherein said locking member comprises a clip adapted to fit within said groove.

4. The coupling of claim 1, wherein said seal is configured to expand radially inwardly upon compression between said shoulder and said retainer to engage the circumference of said probe in a sealing relationship.

5. The coupling of claim 1, wherein said seal is hollow.

6. The coupling of claim 5, wherein the hollow portion of said seal is exposed to fluid pressure within said first bore.

7. The coupling of claim 6, wherein said seal is responsive to be urged radially inwardly in response to fluid pressure within said hollow portion to engage the circumference of said probe in a sealing relationship.

8. The coupling of claim 6, wherein said seal is responsive to be urged radially outwardly in response to fluid pressure within said hollow portion to engage said bore in a sealing relationship.

9. . An undersea hydraulic coupling, comprising:
    (a) a cylindrical body having
        (i) first and second ends,
        (ii) a first longitudinal bore adjacent said first end,
        (iii) a second longitudinal bore adjacent said second end, and
        (iv) a shoulder positioned between said first and second longitudinal bores;
    (b) a cylindrical retainer adapted to be inserted into said first longitudinal bore, said retainer having a longitudinal cylindrical bore substantially coaxial with said longitudinal bore in said body;
    (c) a clip for insertion into said first longitudinal bore of said body for locking said retainer axially against said shoulder; to be inserted
    (d) a cylindrical probe adapted to be inserted through said cylindrical bore of said retainer and through said first longitudinal bore in said body to extend into said second longitudinal bore of said body; and
    (e) a ring-shaped metal seal interposed between said retainer and said shoulder, the inner periphery of said seal to engage the outer wall surface of said probe in sealing relationship.

10. The undersea hydraulic coupling of claim 9 wherein said seal includes a circular cavity operable to cause said seal to be urged radially inwardly against said probe and radially outwardly against said first longitudinal bore of said body in response to pressure within said cavity.

11. A coupling, comprising:
(a) a receiver having a longitudinal bore;
(b) a probe adapted to be inserted into said longitudinal bore, forming an annulus therebetween;
(c) a metal seal for positioning within said annulus for engagement with said bore and with the circumference of said probe, said seal having a cavity exposed to fluid pressure within said bore; and
(d) a retainer configured to be inserted into said annulus to retain said seal in said annulus upon separation of said receiver and said probe.

12. The coupling of claim 11, further comprising a shoulder within said annulus in a seating relationship with said seal.

13. The coupling of claim 11, wherein said seal is responsive to be urged radially inwardly in response to fluid pressure within said cavity to engage the circumference of said probe in a sealing relationship.

14. The coupling of claim 11, wherein said seal is responsive to be urged radially outwardly in response to fluid pressure within said cavity to engage said bore in a sealing relationship.

15. The coupling of claim 11, wherein said seal is responsive to be urged radially inwardly and outwardly in response to fluid pressure within said cavity to seal said annulus to prevent fluid flow therethrough.

16. A coupling comprising:
a cylindrical body having a first circular bore with first and second ends, said bore extending longitudinally through said body;
a stepped shoulder extending inwardly from the wall surface of said first bore intermediate said ends, said shoulder comprising three separate shoulder surfaces progressively farther spaced from said first end and closer to the longitudinal axis of said first bore;
a sleeve-like retainer adapted to slide within said first end of said first bore, a first end of said retainer configured to abut said outermost said shoulder surface and to extend internally over the intermediate said shoulder surface, said retainer defining a second longitudinal bore;
a retractable interlocking member proximate the second end of said retainer to interengage said body and said retainer so as to maintain said retainer in abutting relation with said outmost shoulder surface;
a cylindrical sleeve-like probe member adapted to slide within said second end of said retainer and configured at its inner, first end to abut the innermost said shoulder surface, said probe member defining a third longitudinal bore; and
a hollow circular metal seal member interposed between said retainer and said intermediate shoulder surface and of a character to seal against the outer wall surface of said probe member as well as against said first end of said retainer.

17. The coupling of claim 16, wherein said seal member is a circular C-shaped member whose open end faces toward said intermediate shoulder surface and whose inner peripheral boundary is configured to seal against said probe member upon compression of said seal member.

18. The coupling of claim 16, further comprising a first normally closed check valve within said third bore and configured to open upon a preselected differential force in the direction of said first end of said first bore.

19. The coupling of claim 18, further comprising a second normally closed check valve within said first bore between said first check valve and said second end of said first bore and configured to open upon a preselected differential force in the direction of said second end of said first bore.

20. The coupling of claim 19 in which said first and second check valves are positioned and configured within said coupling to mechanically and mutually exert said forces.

21. A coupling comprising:
a cylindrical body having a first longitudinal bore extending therethrough and terminating in longitudinally spaced first and second ends;
a stepped shoulder extending radially inward from the wall surface of said first bore and intermediate said ends, said shoulder including longitudinally spaced first and second shoulder surfaces, said second surface being radially inward from said first surface and spaced further than said first surface from said first end of said body;
a sleeve-like retainer having first and second ends and adapted to slide within said first end of said first bore, said first end of said retainer configured to abut said first surface and to extend inward over said second surface, said retainer defining a second longitudinal bore substantially coaxial with said first longitudinal bore;
a retractable interlocking member proximate said second end of said retainer configured to interengage said body and said retainer so as to maintain said retainer in abutting relation with said first shoulder surface;
a cylindrical sleeve-like probe adapted to slide within said second end of said retainer and configured at its inner end to extend past said second shoulder surface, said probe defining a third longitudinal bore substantially coaxial with said first and second bores; and
a metallic ring-shaped seal interposed between said retainer and said second surface, said seal configured along its inner periphery to seal against the outer wall surface of said probe.

* * * * *

UNITED STATES PATENT AND TRADEMARK OFFICE
CERTIFICATE OF CORRECTION

PATENT NO. : 4,694,859
DATED : September 22, 1987
INVENTOR(S) : Robert E. Smith, III It is certified that error appears in the above-identified patent and that said Letters Patent are hereby corrected as shown below:

Column 8, line 8, delete "ane" and insert --and--.

Column 8, line 13, delete "asid" and insert --said--.

Column 8, line 19, delete "reatiner" and insert --retainer--.

Column 8, line 58, after shoulder;, delete "to be inserted".

Signed and Sealed this

Fifth Day of April, 1988

Attest:

DONALD J. QUIGG

Attesting Officer

Commissioner of Patents and Trademarks